March 18, 1952

S. NOODLEMAN 2,589,277

MOTOR CONTROL SYSTEM

Filed Nov. 5, 1948

INVENTOR.
Samuel Noodleman,
BY Dybvig & Dybvig.
His Attorneys.

March 18, 1952     S. NOODLEMAN     2,589,277
MOTOR CONTROL SYSTEM

Filed Nov. 5, 1948     3 Sheets-Sheet 3

INVENTOR.
Samuel Noodleman,
BY Dybvig & Dybvig
His Attorneys.

Patented Mar. 18, 1952

2,589,277

UNITED STATES PATENT OFFICE 2,589,277

MOTOR CONTROL SYSTEM

Samuel Noodleman, Dayton, Ohio, assignor to Louis R. Mahrt and D. Robert Laughter, as trustees for Standard Dayton Corporation, Dayton, Ohio, a corporation of Ohio Application November 5, 1948, Serial No. 58,445

13 Claims. (Cl. 318—210)

This invention relates to a motor control system and more particularly to a system in which a ripple current generated as a result of the relative rotation between the bars of the armature and the field poles is utilized for supplying power to the control system.

It is an object of this invention to provide an improved motor control arrangement which responds directly and accurately to changes in motor speed and which may be added to existing motors.

Another object of this invention is to provide a plug control in which compensation is automatically made for changes in the inertia load.

Another object of this invention is to provide a motor control device which is truly responsive to speed and in which the speed responsive means may be mounted outside of the motor frame without the need for any mechanical connection to the motor.

Still another object of this invention is to provide a plug control for a motor which may be made very cheaply and which is dependable in operation.

Another object of this invention is to provide a motor control which accurately responds to the speed of any type of motor including direct current motors.

Other objects and advantages reside in the construction of parts, the combination thereof and the mode of operation, as will become more apparent from the following description.

In the drawings:

Figure 2 is a schematic circuit diagram showing a modified motor control system embodying features of my invention.

Figure 1:
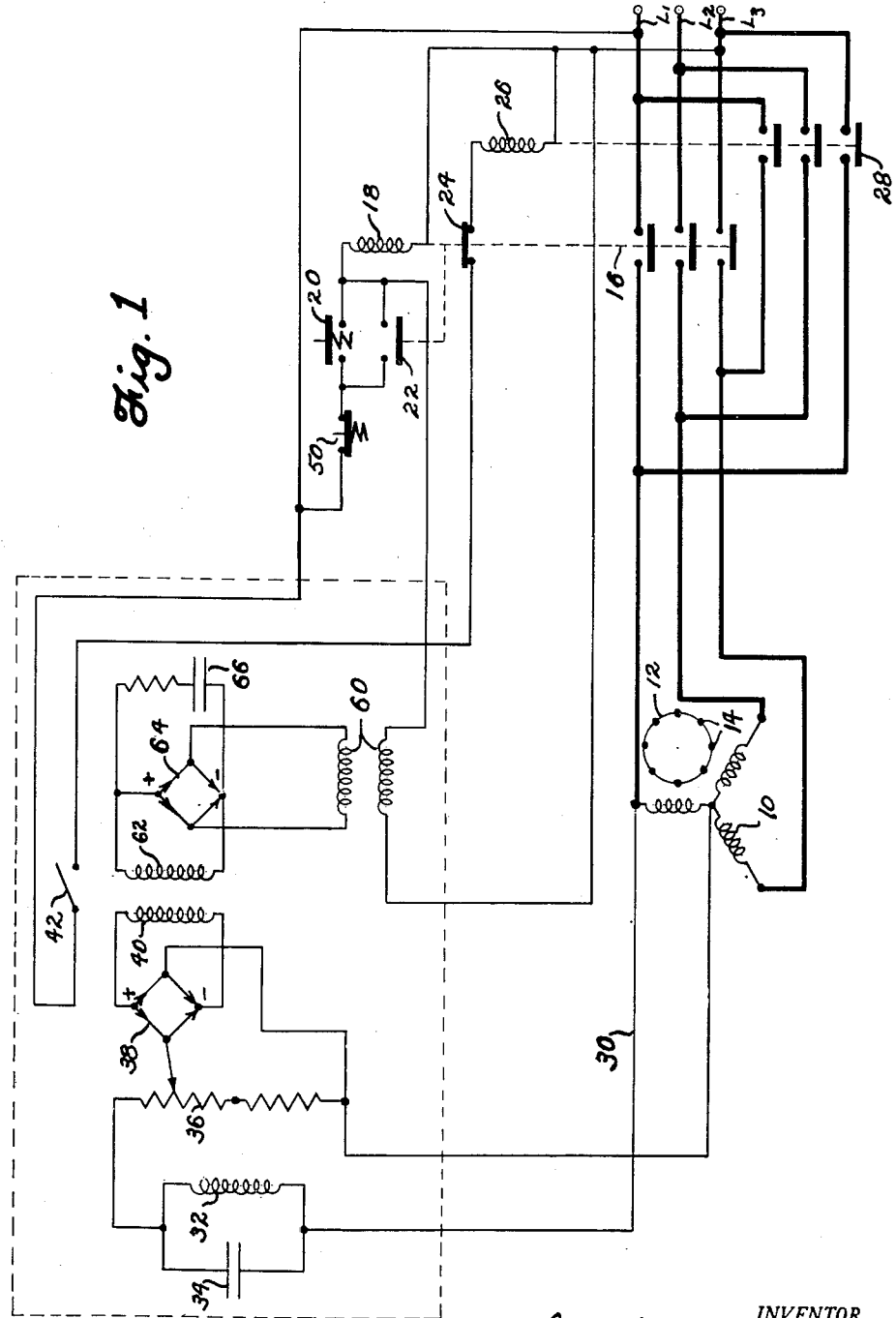
Figure 1 is a schematic circuit diagram illustrating a preferred embodiment of a plug controller applied to a motor.

Referring now to Figure 1 of the drawings wherein I have shown one embodiment of my invention, reference numeral 10 designates the field windings of a conventional three phase alternating current motor having a revolving armature 12 provided with conventional armature bars 14 which pass through the magnetic flux created by the field windings 10. Reference characters $L_1$, $L_2$ and $L_3$ designate the main power lines used in supplying power to the field windings 10 and reference numeral 16 designates the main switch which when closed supplies power to the motor so as to operate it in the forward or normal running direction. The switch 16 is controlled by the running solenoid 18 which is under control of a conventional start switch 20. Closing of the start switch 20 causes energization of the solenoid 18 whereby the switch 16 closes and initiates operation of the motor in the forward direction. Energization of the solenoid 18 causes the holding switch 22 to be closed and opens the switch 24 located in series with the reversing solenoid 26. The reversing solenoid 26 controls the motor reversing switch 28 in accordance with conventional practice. The control elements described thus far are standard elements now commonly used in starting and stopping motors.

I have found that a high frequency ripple is generated in every type of motor in which a rotor having conductors carrying current passes a stator which has teeth and slots. I have also found that this high frequency ripple can be used to actuate a switch at a selected motor speed.

For a given motor design, the magnitude of the ripple is a function of the product of the rotor speed and current in the rotor bars. The frequency of the ripple is the product of the rotor speed and the number of rotor bars. Thus, a 48 bar rotor operating at 1800 R. P. M. or 30 revolutions per second will have a frequency of 48 x 30 or 1440 cycles per second. The magnitude of this ripple will be very low when the motor is running at idle speed and will be maximum when the rotor is turning at idle speed and when the field has been reversed as at the instant of plug.

In order to utilize this ripple for control purposes, it is necessary to provide a filter capable of reducing the effect of the line frequency power to the point where it will not affect the relay operation. It has been found that relays of the type disclosed herein will operate satisfactorily on all types of motors, even though the motors have excessive air gaps or have deeply embedded rotor bars or rotor bars with excessive skew or of high resistance. The ripple is present wherever a rotor having conductors carrying current passes a stator which has teeth and slots. Thus, the ripple is present in direct current motors as well as all types of induction motors, whether squirrel cage or wound rotor type.

The circuits shown in Figures 1 and 2 may be used for plugging on any type of motor which can be reversed. Thus, these controls can be used on delta-delta and delta-Y connected motors, or with two phase or single phase motors, as long as the connections are properly made so as to pick up the ripple.

Peculiarly enough, the percentage of ripple voltage is about the same in all motor sizes. Thus, a ¼ H. P. motor and a 100 H. P. motor may both generate a maximum of 5% ripple voltage. However, the capacity of this ripple is a function of the motor size. Thus, the ¼ H. P. motor may have a maximum ripple output of 0.5 watts, while the 100 H. P. motor can supply 50 watts ripple power.

As the ripple frequency approaches the power line frequency, the attenuation becomes increasingly greater and thus as the rotor speed approaches zero, the ripple voltage curve approaches zero at a rotor speed supplying 60 cycles ripple. Preferably the arrangement is set so that for most motors it will open the circuit at a minimum speed of about 200 R. P. M. Thus, for a 48 slot rotor, this would correspond to a ripple frequency of 160 cycles per second. The circuit arrangement shown in Figure 1 of the drawings is recommended where the plug time is less than two seconds and thus where a cut-off of 200 R. P. M. will not cause undesirable coasting.

This circuit includes a first lead wire 30 connected to one of the motor field terminals and to a filter choke 32 and a 1.0 microfarad resonating condenser, as shown. The condenser 34 resonates with the 7 henry filter choke to provide a block for the 60 cycle waves resulting from the 60 cycle power supply. All values given herein are for purposes of illustration only and may be varied to suit particular conditions.

In the circuit arrangement shown in Figure 1 of the drawings, the ripple is supplied to the 400 ohm variable potentiometer 36 which allows one to vary the amount of ripple or voltage at which the relay 40 drops out. The ripple voltage is fed into a rectifier 38 which supplies rectified current to the control relay solenoid 40 which is designed to hold the switch 42 closed at all times during plugging when the speed of the motor exceeds a predetermined speed, such as 200 R. P. M. In order to stop the motor, the stop switch 50 is opened, whereby the flow of current to the running solenoid 18 is interrupted. This interruption of current to the solenoid 18 causes the switches 16 and 22 to open and the switch 24 to close. Closing of the switch 24 immediately energizes the reversing solenoid 26 which closes the reversing switch 28, whereby the field torque is reversed and the motor very promptly reduces its speed. This reduction in speed reduces the effectiveness of the ripple voltage to a predetermined point where the control relay solenoid 40 no longer is supplied with power enough to hold the switch 42 closed.

Since opening of switch 16 cuts off the supply of current to the field windings of the motor before the reversing switch 26 has had time to close, it is necessary to provide a time delay means for momentarily holding the switch 42 closed during the time interval between the opening of switch 16 and the closing of switch 28. Upon closing the starting switch 20, current is supplied to the condenser 66 and the relay coil 62 through the transformer 60. This causes the coil 62 to close the switch 42. After deenergization of coil 18 and transformer 60, the charge on the condenser 66 is then available for energizing the solenoid 62 for a period of time sufficient to hold the switch 42 closed until switch 28 closes. After switch 28 closes, the coil 40 will be supplied with current for holding the switch 42 closed until the reduction in speed indicates that it is time for the switch 42 to open and thereby deenergize the reversing relay 26 so as to open the switch 28.

In Figure 2 of the drawings, I have shown a control system similar to the one shown in Figure 1 but utilizing an additional circuit which enables one to cut off the power to the motor at speeds considerably lower than any systems previously used. The system shown in Figure 2 uses a circuit which is essentially the same as the circuit shown in Figure 1 but has in addition a time delay circuit which operates as a function of the total plug time.

The same reference characters have been used to designate like parts in Figures 1 and 2 and, unless otherwise indicated, these parts serve the same purpose in both systems.

If a motor requires six seconds to plug from 1800 R. P. M. to zero, the control relay 42 operating off the ripple will hold the circuit 70 closed at the start of the plug. Meanwhile the condenser 72 in the time delay circuit 79 starts to charge. The charging current is supplied to the condenser by the transformer 77 which is connected in the circuit as shown. As the speed drops below say 300 R. P. M., the control relay 42 opens and the time delay relay 74 now holds the circuit in, the time delay condenser 72 discharging into the relay 74, so as to hold it closed the remaining one second, so that it stops at exactly zero speed. If the inertia of the driven elements were removed so that the motor would require only two seconds to plug, the time delay relay would open the same instant as the control relay, as the time delay condenser would not have sufficient charge to add any time delay. In this manner, machines with high inertia systems can be accurately brought to zero. For purpose of illustration, I have shown a control system in which I have incorporated an additional relay 73 to handle the contactor current. Opening of relay 74 causes relay 73 to open and this in turn causes the solenoid 26 to open the switch 28 and close the switch 80 which is arranged in the circuit as shown.

By virtue of the above described arrangement, it is obvious that temperature conditions do not disturb the time of the control system and consequently a unit which is set to plug to zero speed in a cold motor will still plug to zero in a hot or overheated motor.

The above described control systems may be used in controlling torque motors such as used in operating clamps and the like. When used in this manner, they serve to cut off the power when the motor slows down to a given speed. The controls can be used for plugging through resistors and they can be used to plug in both directions and are not affected by unbalanced line voltages. Being truly a speed responsive control, it can also be used for regulating the speed of motors.

Figure 3:
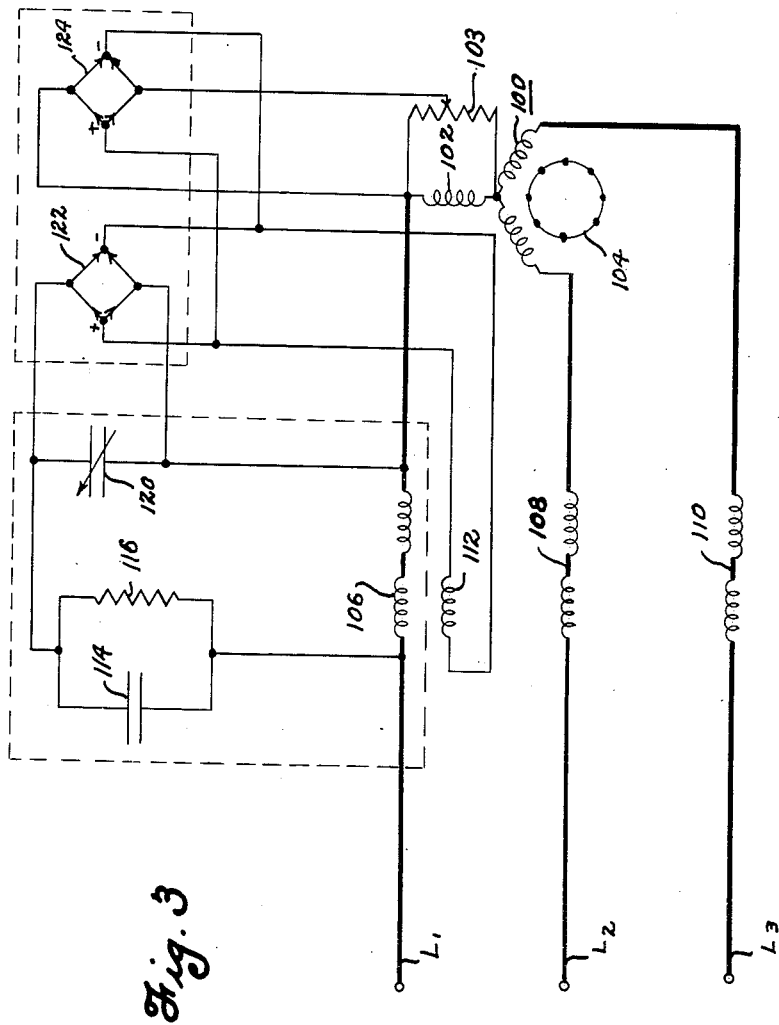
Figure 3 is a schematic circuit diagram showing an improved motor control system for providing constant speed operation.

In Figure 3 of the drawings, I have shown a motor control system in which the ripple is used to provide a constant speed control for a motor. For purposes of illustrating my invention, I have shown a conventional polyphase motor 100 having a field winding 102 and a squirrel cage rotor 104 of standard construction. Saturable reactors 106, 108 and 110 have been placed in the power lines leading to the motor, as shown. The impedances of the saturable reactors 106 are controlled by the direct current control coil 112 in which the flow of current varies in response to any change in the ripple resulting from any change in speed. As shown in the drawings, the control circuit includes a condenser 114 which resonates with the filter choke 116 and serves to block out the 60 cycle line frequency power. (For power frequencies other than 60 cycles, the blocking condenser would be designed to block out the power corresponding to the line frequency.) A variable condenser 120 is provided, as shown, whereby the rectifier 122 is supplied with power derived from the ripple frequency. A second rectifier 124 is provided which has its alternating current input terminals connected across a variable resistor 103 connected across the one phase winding, as shown, so as to be operated by the phase voltage. The direct current output of the rectifiers 122 and 124 is then used for supplying direct current to the impedance varying control coil 112 of the saturable reactor 106.

By virtue of this circuit arrangement, it is possible to very closely control the speed of the alternating current motor. By adjusting the variable condenser 120, it is possible to adjust the speed at which the motor will operate. At a given setting of the variable condenser 120, a decrease in the speed of the motor will cause a decrease in the effectiveness of the ripple voltage whereby less current will be available in the coil 112 and this reduction of current flowing through coil 112 will reduce the impedance in the power line and this in turn will cause an increase in the motor speed.

Since controls of this type respond instantaneously to the slightest changes in the speed of the motor, it is obvious that a control of this type can be used to closely regulate the motor speed of conventional motors. Furthermore, these controls are inexpensive and can be used with standard motors.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a motor, a source of power for energizing said motor, said motor having a polyphase stator winding, means connected across one phase of said stator winding for detecting the presence of the high frequency ripple generated within the motor as a result of the relative rotation between the stator and rotor of the motor, means for controlling the flow of current from said power source to said motor, and means operated in response to a predetermined change in the ripple frequency for operating said control means.

2. In combination with a squirrel cage motor having a stator and a rotor, said stator having a winding disposed to generate a ripple therein, resulting from relative rotation between said rotor and said stator, control means for said motor, means operated in response to a predetermined variation in said generated ripple, said last named means including a blocking filter connected in parallel with said winding, a rectifier connected in series with said blocking filter and said winding for rectifying the signals generated within said winding, and a solenoid connected to the output of said rectifier for operating said control means.

3. In a plug controller for an induction motor in which a first switch is used for controlling the flow of current to the motor during normal running operations and a second switch is used for supplying current to the motor during the plugging operation, means connected across one portion of the motor winding for picking up the induced ripple voltage generated in response to relative rotation between the motor rotor and motor stator, and means operated in response to a change in the induced ripple voltage for controlling the operation of said second switch.

4. In combination with a squirrel cage motor having a stator and a rotor, at least one of which includes a winding disposed to generate a ripple resulting from relative rotation between said rotor and said stator, control means for said motor, means operated in response to a predetermined variation in said generated ripple, said last named means including a blocking filter connected in parallel with said winding, a rectifier connected in series with said blocking filter and said winding for rectifying the signals generated within said winding, a time delay circuit, and a solenoid connected to the output of said rectifier for operating said time delay circuit, said time delay circuit including a solenoid for operating said control means.

5. In combination, a polyphase squirrel cage motor having a plurality of phase windings, power lines leading to said phase windings, a saturable reactor arranged in one of said power lines, and means responsive to changes in the speed of said motor for varying the impedance of said saturable reactor, said last named means comprising means operated in response to changes in the ripple voltage across said reactor.

6. In combination with a polyphase motor, power lines leading to said motor, impedance means in each of said power lines, at least one of said impedance means comprising a saturable reactor having a direct current coil for controlling the impedance thereof, rectifier means for supplying current to said direct current coil, and means for supplying voltage to said rectifier means, said last named means comprising a variable condenser connected in series with a filter across said impedance means.

7. In combination with a polyphase motor, power lines leading to said motor, impedance means in each of said power lines, at least one of said impedance means comprising a saturable reactor having a direct current coil for controlling the impedance thereof, rectifier means for supplying current to said direct current coil, and means for supplying voltage to the input side of said rectifier means, said last named means comprising a variable condenser connected in series with a filter across said impedance means, said filter serving to reduce the line frequency power to a point where it will not materially affect the rectifier means.

8. In combination with a polyphase motor, power lines leading to said motor, impedance means in each of said power lines, at least one of said impedance means comprising a saturable reactor having a direct current coil for varying the saturation thereof, a first rectifier having its input lines connected across one phase winding of said motor and having its output lines connected to said direct current coil, a second rectifier having its output terminals connected to said direct current coil, and means influenced by changes in the speed of said motor for supplying current to said second rectifier.

9. In combination, a motor having a stator and a rotor, at least one of which includes a conductor arranged to generate a ripple voltage resulting from relative rotation between said rotor and said stator, a resonating circuit connected across said conductor and including means for blocking voltages of a predetermined frequency corresponding to the frequency of the supply voltage, means responsive to a change in the generated ripple for controlling a first relay, a timing circuit controlled by said first relay and including a second relay adapted to be operated a predetermined time interval after the operation of said first named relay, a third relay controlled by said second named relay, and switch means for controlling the supply of power to said motor controlled by said third relay.

10. In combination with a motor having a stator and a rotor, said stator having a winding influenced by relative rotation between said rotor and said stator for generating a high frequency ripple, a source of electrical energy for supplying power at a given frequency to said winding, switch means for controlling the supply of power to said winding from said source, first relay means for operating said switch means, second relay means responsive to changes in said ripple for controlling said first relay means, said second relay means including means for blocking frequencies corresponding to the frequency of said supply source.

11. In combination with a motor having a stator and a rotor, at least one of which includes a conductor in which a high frequency ripple is generated in response to relative rotation between the stator and the rotor, a first relay circuit for controlling the supply of electrical current to said motor, a second relay circuit for controlling the operation of said first relay circuit, said second relay circuit including a switch, a pair of solenoid coils for controlling the operation of said switch, means responsive to a change in the frequency of said high frequency ripple for supplying energy to one of said coils, and means including a storage condenser for supplying current to the other of said coils for a predetermined time interval after said first named coil is deenergized.

12. A speed responsive device for use in combination with an inductive portion of the circuit of an electric motor having a stator and a rotor comprising, a resonating circuit adapted to be connected across said inductive portion of the motor and having a circuit blocking condenser and a filter choke connected in parallel relationship to one another to form a resonator for blocking out frequencies corresponding to the frequency of the main motor energizing current, a variable impedance connected in series with said resonator, a rectifier having its input terminals connected across said variable impedance, and a relay device connected to the output side of said rectifier so as to operate in response to a predetermined change in speed of said motor.

13. In a plug controller system for use with a polyphase motor, means including a first switch for supplying power to said motor for operating said motor in the forward direction, means including a second switch for supplying power to said motor in a phase relationship to reverse the torque of said motor, a time delay circuit including a storage condenser and a delayed action relay connected in parallel across a source of power for charging said condenser in response to opening of said first switch and closing of said second switch, means responsive to the ripple generated in said motor as a result of the relative rotation between the motor stator and the motor rotor for disconnecting said storage condenser from said source of power, and means operable in response to deenergization of said relay for opening said second switch.

SAMUEL NOODLEMAN.

REFERENCES CITED

The following references are of record in the file of this patent:

UNITED STATES PATENTS

| Number | Name | Date |
|---|---|---|
| 1,663,890 | Stoller | Mar. 27, 1928 |
| 1,828,564 | Hardesty | Oct. 20, 1931 |
| 1,936,620 | Crout et al. | Nov. 28, 1933 |
| 2,131,607 | Wade | Sept. 27, 1938 |
| 2,165,491 | Leitch | July 11, 1939 |
| 2,165,521 | Taylor | July 11, 1939 |
| 2,349,308 | Rhyne | May 23, 1944 |
| 2,395,246 | Bousky | Feb. 19, 1946 |
| 2,395,516 | Morton et al. | Feb. 26, 1946 |
| 2,427,920 | Morrison | Sept. 23, 1947 |
| 2,433,153 | Pell et al. | Dec. 23, 1947 |
| 2,437,611 | Morrison | Mar. 9, 1948 |
| 2,442,213 | Ross | May 25, 1948 |
| 2,462,751 | Koehler | Feb. 22, 1949 |